United States Patent [19]

Sauer et al.

[11] 4,252,016
[45] Feb. 24, 1981

[54] AIR FLOW RATE METERING INSTRUMENT

[75] Inventors: Rudolf Sauer, Benningen; Heinz Gneiss, Ludwigsburg; Peter Romann, Stuttgart, all of Fed. Rep. of Germany

[73] Assignee: Robert Bosch GmbH, Stuttgart, Fed. Rep. of Germany

[21] Appl. No.: 42,258

[22] Filed: May 24, 1979

[30] Foreign Application Priority Data

Jun. 27, 1978 [DE] Fed. Rep. of Germany ....... 2828102

[51] Int. Cl.³ .............................................. G01F 1/68
[52] U.S. Cl. ..................................................... 73/204
[58] Field of Search ................. 73/27 R, 204; 338/25, 338/28, 316

[56] References Cited

U.S. PATENT DOCUMENTS

| 1,156,630 | 10/1915 | Savage | 73/204 |
| 1,260,498 | 3/1918 | Wilson | 338/25 |
| 3,971,247 | 7/1976 | Rodder | 73/204 |

Primary Examiner—Herbert Goldstein
Attorney, Agent, or Firm—Edwin E. Greigg

[57] ABSTRACT

A flow rate meter, especially for measuring the air flow rate in the intake of internal combustion engines, in which a heatable wire is located for exposure to the air stream. A controller maintains the temperature or resistance of the heated wire constant, thereby permitting a determination of the air flow from the current required in the control process. In order to prevent internal stresses in the wire due to varying expansion, the two ends of the wire are firmly mounted in a support structure while at least one intermediate part is looped loosely around an intermediate support point. In order to prevent uncontrollable heat transfer from the loop to the third support point, the wire is electrically joined at the point where the parts of the wire forming the loop cross one another, thereby preventing electrical current from flowing in the loop. Furthermore, the sensitive parts of the wire lie in the main flow and do not closely approach the wall of the structure.

6 Claims, 2 Drawing Figures

4,252,016

AIR FLOW RATE METERING INSTRUMENT

FIELD OF THE INVENTION

The invention relates to flow rate metering, especially air flow rate metering in the induction tube of an internal combustion engine. More particularly, the invention relates to air flow rate metering by means of a temperature-dependent resistor which is part of a control circuit that maintains the temperature of a hot wire and monitors its resistance. Alternatively, the resistance of the hot wire may be maintained to obtain information regarding the air flow rate.

BACKGROUND OF THE INVENTION AND STATE OF THE ART

Known in the art are air flow rate meters which employ temperature-dependent resistors, for example a heated wire which is tautly suspended between two supports. Due to the wide range of temperatures occurring in the induction tube of a motor vehicle, a wire suspended in this manner does not have a very long lifetime and is subject to rapid fracture.

It has also been proposed in the art to suspend the hot wire in the shape of a V within an annular support wherein the two ends are rigidly attached to their respective support points while the point of the V is guided loosely over a glass bead placed at a central support location. However, due to the variable extension of the hot wire as a function of temperature, the point of contact with the central support is not well defined and changes depending on the prevailing length of the wire. Accordingly, the heat transfer from the wire to the glass bead changes unpredictably, resulting in measuring errors in the determination of the air flow rate.

OBJECT AND SUMMARY OF THE INVENTION

It is thus a principal object of the present invention to provide an air flow rate measuring instrument which overcomes the aforementioned disadvantages and which does not introduce any measuring errors or imprecision which are due to changes in the ambient temperature or changes in the heating power applied to the hot wire. This object is attained according to the invention by providing that the hot wire is so suspended that the portion of the hot wire which makes contact with the central support point carries no electrical current. In particular, the hot wire is looped around the central support point and the wire is placed in electrical contact at the point where the two portions of the wire forming the loop cross each other. Accordingly, the loop carries no electrical current so that it is no longer significant if the loop is raised or displaced somewhat on a central support point due to changes in temperature because the effective length of the hot wire is unchanged thereby. Furthermore, the entire active length of the hot wire lies well within the region of the main air stream, rather than being partly in the boundary region of the induction tube where the relatively low and poorly defined air speed might introduce measuring errors.

In a particular feature of the invention, the loop is given a well defined shape, in particular a shape in which the looping angle is less than 180°. Furthermore, the loop is so shaped and placed that the points of contact of the loop and the support point and the remaining points in the loop are well separated, thereby permitting expansion of the hot wire or the loop without the introduction of mechanical stresses.

The invention will be better understood as well as further objects and advantages thereof become more apparent from the ensuing detailed description of a preferred exemplary embodiment taken in conjunction with the drawing.

DESCRIPTION OF THE PREFERRED EMBODIMENT

Figure 1:
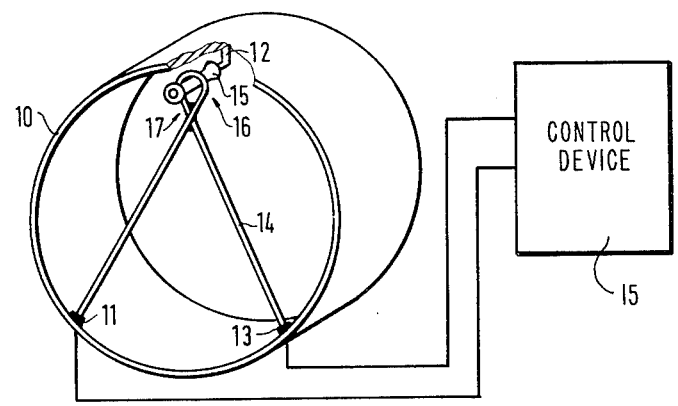
FIG. 1 is a schematic perspective view of a hot wire suspended in V-shape on three points of support.

Turning now to FIG. 1, there will be seen a support ring 10 serving to support and hold the hot wire of a hot wire flow rate meter whose other details are not illustrated. The hot wire 14 is suspended in the overall shape of a V, i.e., it has three support points. The two ends of the wire are rigidly attached to support points 11 and 13 at which points they would be placed in electrical contact with suitable control circuits 15 of the hot wire flow rate meter, not further illustrated and known per se. The point of the V is formed into a small loop which is loosely guided on the third support point 12.

The hot wire 14 is suitably made of platinum. Advantageously, the material from which the ring 10 is constructed and which serves as a carrier for the hot wire 14 is such that its coefficient of thermal expansion is nearly equal to that of the hot wire 14 so that any expansions or changes in the wire 14 and the ring 10 will not generate any stresses or compression in the hot wire 14 due to being compensated by the changing distances among the support points 11, 12, 13.

The stress-free suspension of the hot wire is of great importance in operation, especially if the hot wire is used in the air flow rate meter within the induction tube of a motor vehicle where the range of temperatures which can routinely occur is from −30° to +120° C. Superimposed on this ambient temperature change is a temperature change due to the intentional electrical heating of the hot wire 14. The wire may be made red hot so as to burn off any impurities which may have attached themselves to its surface. However, even this relatively short-term heating changes the length of the hot wire which would introduce unacceptable stresses if the wire were suspended rigidly. Such stresses are prevented by the V-suspension of the hot wire 14 and the matching of the coefficients of thermal expansion of the ring 10 and the hot wire 14. Suitably, the ring 10 is made of a nickel-iron alloy whose coefficient of thermal expansion approximately matches that of a platinum wire 14. However, the ring 10 may also be made of glass, especially of so-called platinum glass whose coefficient of thermal expansion also matches that of platinum wire so that any tensile or compressive stresses are prevented from being generated within the hot wire 14 when changes in temperature occur.

As may be seen from FIG. 1, the central support point 12 carries a glass bead 15 over which the middle portion of the hot wire 14 is looped in a loop 16. The glass bead 15 serves to provide electrical insulation between the hot wire 14 and the ring 10. As is also seen in FIG. 1, the parts of the hot wire 14 which cross one another in the vicinity of the loop 16 are placed in electrical conduction, thereby making the loop an equipotential region in which no current flows and no heat is generated. Accordingly, the exact looping angle of the hot wire 14 supported by and in contact around the glass bead 15 is not critical and even if the degree of contact and thus the amount of heat transfer from the hot wire 14 to the glass bead 15, during changes in length or displacement, is unknown, this fact is not of practical significance. The type of suspension of the hot wire 14 on the central support point 12 and the electrical union of the crossing parts of the wire amount to an electrical and thermal decoupling of the loop 16 from the rest of the wire. It may thus be possible under certain circumstances to dispense with the glass bead 15 and to place the loop 16 directly on the support point 12. Furthermore, the existence of the current-free loop 16 on the support point 12 causes the entire active length of the hot wire to lie in the region of active air flow rather than near the wall where the air flow is small and not well-defined so that the hot wire 14 could easily be overheated. The loose suspension of the loop 16 also prevents oscillations which might take place in the case of engine backfire, thereby preventing excessive mechanical loads.

Figure 2:
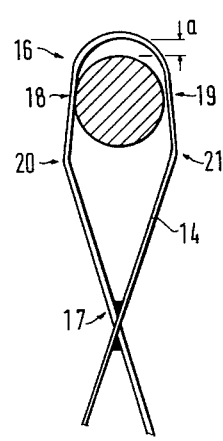
FIG. 2 is a detail of the loop portion of the hot wire according to the invention.

It has been found especially suitable to shape the loop 16 in a particular way, for example that illustrated in FIG. 2. When the loop is shaped as illustrated there, the looping angle is less than 180°. The looping angle is formed between the verticals of the wire sections shown in FIG. 2 taken from the center point of the support point (see 18 and 19) relative to the various wire sections. The shape of the loop 16 further insures that there is a space between the points 18 and 19 of the loop 16 which makes contact with the bead 15 and the two points 20 and 21 which constitute the ends of the straight portions of the wire. Accordingly, when the loop 16 or the wire 14 change in length, the loop can move freely on the glass bead 15 at least to within the distance labeled "a", thereby preventing any mechanical stresses in the wire.

The electrical union of the two parts of the wire which cross one another may take place by welding or hard-soldering.

While the exemplary embodiment illustrated in FIG. 1 describes the suspension of the hot wire on three support points, it is considered to be entirely within the frame of the invention to employ more than three support points, provided that all but the two terminal end points are constructed in the manner described above, i.e., that the wire is placed around them as loops whose crossing wire portions are joined electrically.

The foregoing relates to a preferred exemplary embodiment of the invention, it being understood that other embodiments and variants thereof are possible within the spirit and scope of the invention.

What is claimed and desired to be secured by Letters Patent of the United States is:

1. A flow rate metering instrument including a temperature-dependent resistor and a controller for maintaining an electrical parameter of said resistor at a predetermined value to thereby infer flow rate, and wherein, according to the invention, said resistor is a heatable wire whose ends are fixedly attached to a structure for exposure to the flow and wherein at least one intermediate region of said wire between said ends is looped loosely over at least one intermediate support point, causing two parts of said wire to cross one another adjacent to said loop and wherein said two crossing parts are joined for electrical contact.

2. An instrument according to claim 1, wherein said at least one intermediate support point has an electrically insulating cover for preventing electrical conduction between said heatable wire and said structure.

3. An instrument according to claim 2, wherein said electrically insulating cover is a glass bead.

4. An instrument according to claim 1, wherein said crossing parts of said wire are joined by welding.

5. An instrument according to claim 1, wherein said crossing parts of said wire are joined by hard-soldering.

6. An instrument according to claim 1, wherein said wire is looped around said at least one intermediate point with a looping angle at most equal to 180° and wherein said loop is so formed that the points of contact of said loop with said intermediate support point are separated by a finite distance from the points of said wire beginning with which said loop is formed; whereby said heatable wire is capable of expansion and contraction without the generation of internal stresses.

* * * * *